July 24, 1962 L. J. TORN ET AL 3,046,533
GAGING APPARATUS
Filed July 29, 1957 2 Sheets-Sheet 1
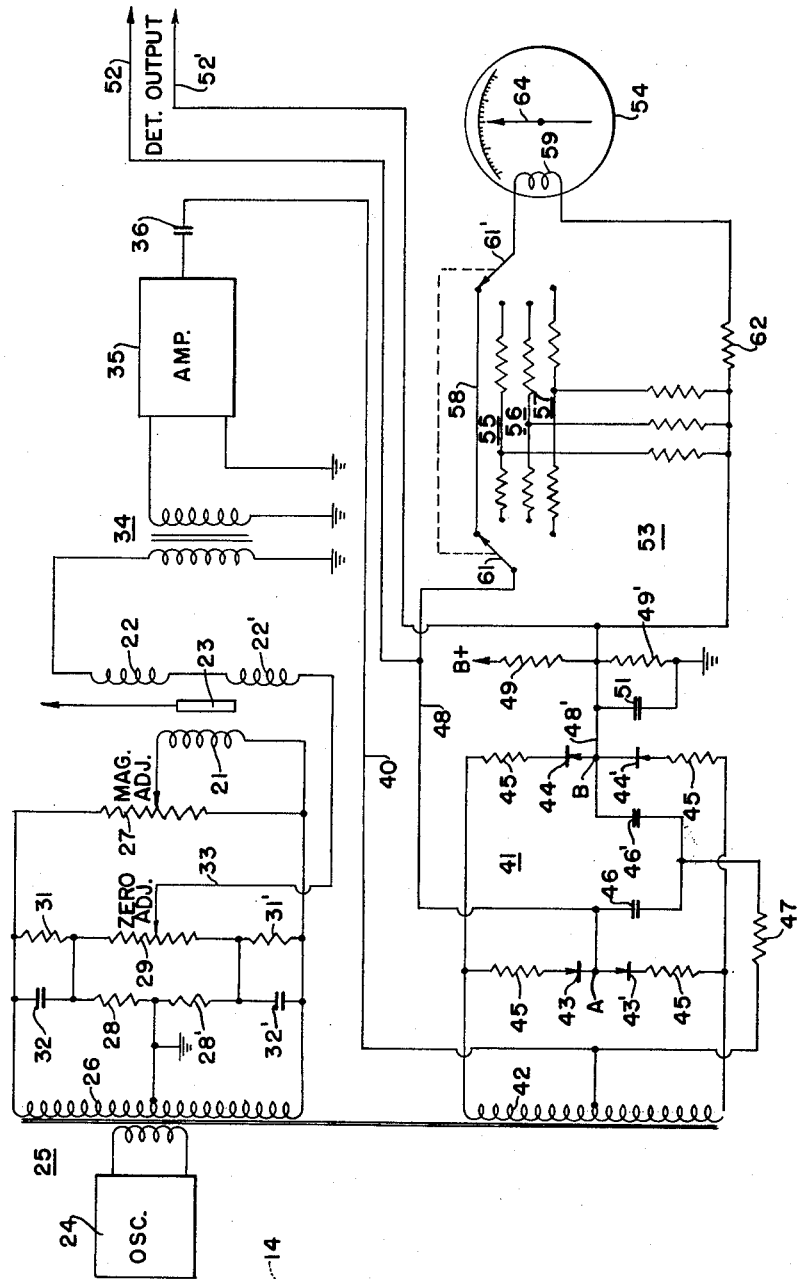
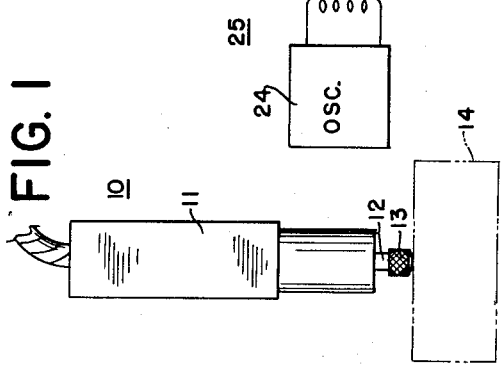
INVENTORS
LAWRENCE J. TORN
JAMES P. PHILBIN
BY
Pennie, Edmonds,
Morton, Barrows & Taylor
ATTORNEYS

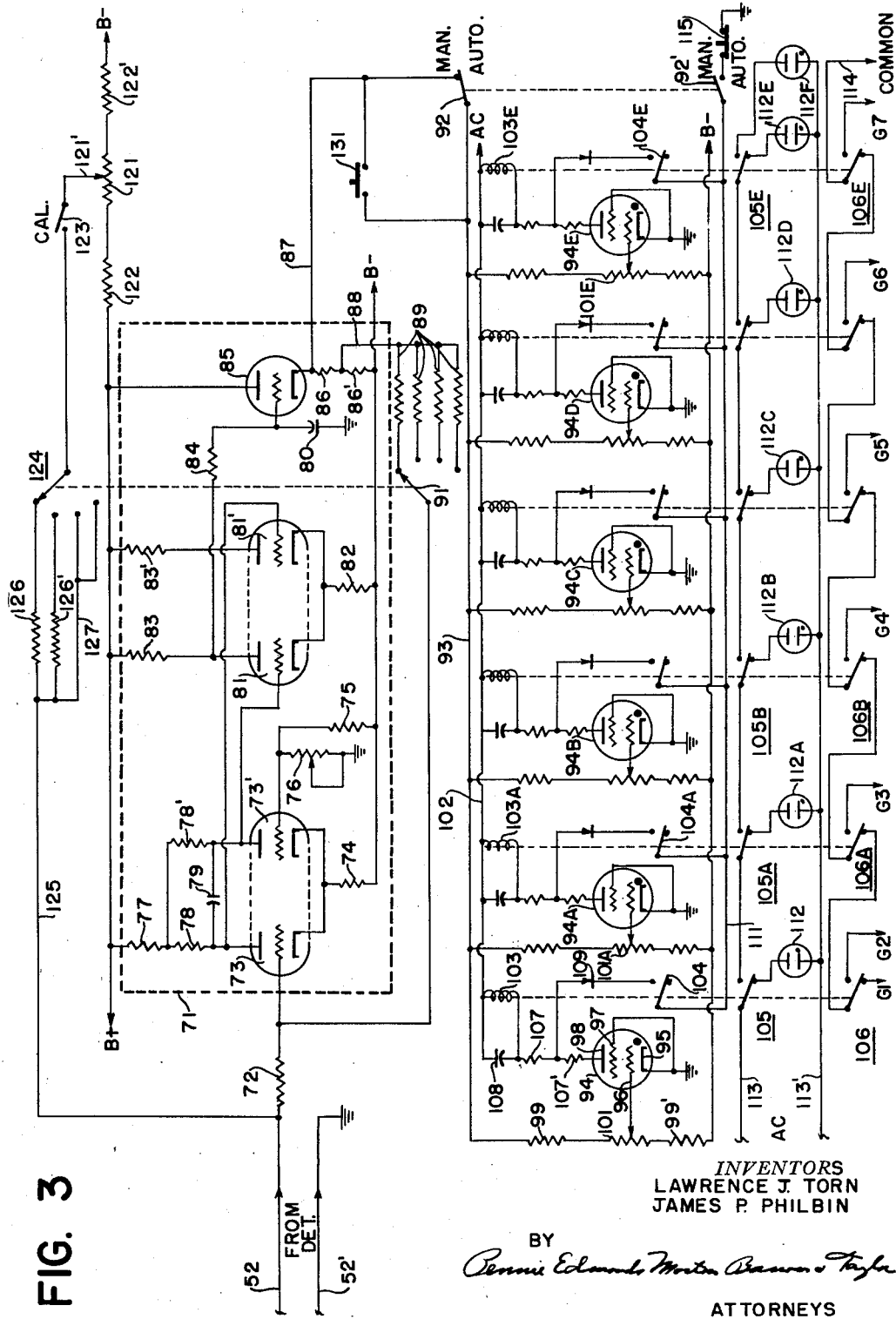

United States Patent Office 3,046,533
Patented July 24, 1962

3,046,533
GAGING APPARATUS
Lawrence J. Torn, Seaford, and James P. Philbin, East Northport, N.Y., assignors, by mesne assignments, to Cutler-Hammer, Inc., Milwaukee, Wis., a corporation of Delaware
Filed July 29, 1957, Ser. No. 674,876
19 Claims. (Cl. 340—178)

This invention relates to gaging apparatus, and particularly to the gaging of parts produced by a machine tool and the development of control signals corresponding to variations in part size.

In the machine tool industry it is desirable to be able to gage parts either as they are produced, or after production. Such apparatus should be simple, reliable and capable of measuring variations in part size over a considerable range. Usually it is desired to measure departures from nominal size, so as to determine whether the part is within tolerance or not. For this purpose, it is important to be able to adjust the gaging apparatus quickly and accurately to the nominal part size.

In many cases it is desired to classify the parts into several categories or grades, depending upon how much the part deviates from nominal value. In some cases three categories suffice, namely, within-tolerance, oversize and undersize. In other cases more categories are required.

When parts are gaged after production, actuation of suitable sorting means is desirable in order to segregate the parts into appropriate categories. When parts are gaged during production, or immediately after completion, the information as to variation in part size may be employed to adjust the machine tool for subsequent production.

In accordance with the present invention, gaging apparatus is provided employing a gaging device yielding an A.-C. output signal which varies in amplitude with the dimensions of the parts being gaged. This A.-C. output signal is then rectified to obtain a corresponding varying D.-C. output signal and the latter is applied to an indicating meter. To permit accurate adjustment for nominal part size, an electrical size control circuit is provided which introduces an adjustable A.-C. correction signal ahead of the detector, so that the combined A.-C. output and correction signals are rectified and the D.-C. output signal of the detector represents departures from a selected nominal size. A variable attenuator having substantially constant input impedance is inserted between the detector and the indicating meter. Thus, switching from one range to another on the indicating meter has substantially no effect on the detector output nor on the adjustment for nominal part size, so that the signal output of the detector can be used for sorting or control purposes regardless of the meter range selected, without impairment of accuracy.

A classifying circuit is supplied with the output of the detector and contains a plurality of switching devices which are individually settable to switch at selected values of the detector output, thereby providing signals which can be used for sorting, machine tool control, or other purposes. The relationship of size control adjustment, meter range switching and classifying circuit is such that classifying can proceed accurately even though the meter range is changed, and both classifying and meter indications are with respect to the same nominal part size which itself is readily adjustable.

A calibration circuit is provided which permits the switching devices to be set at particular values corresponding to desired departures from nominal value quickly and accurately, without requiring the use of master gages or parts of different size. Indicator lights and output circuits are provided to indicate the variations in part size and to provide means for controlling sorting apparatus, or the machine tool, etc. The circuit arrangements are such that only the indicator light and output circuit (or circuits) corresponding to one category or grade are effective for a given measurement, and this is accomplished without removing power from or otherwise disabling switching devices corresponding to other categories. In this manner positive indication and control can be obtained while preserving high speed capabilities.

Individual hold circuits are provided for the switching devices so that the indication and control circuits can be held over until the next part is measured, and these hold circuits are simultaneously releasable.

These and other features of the invention will in part be pointed out in the following description of a specific embodiment thereof, and in part will be obvious.

In the drawings:

FIG. 1 is a view of a gage head in contact with a part to be measured;

FIG. 2 is a circuit diagram of a measuring unit in accordance with the invention; and FIG. 3 is a circuit diagram of a classifying unit in accordance with the invention.

Referring to FIG. 1, the gage head 10 comprises a housing 11 containing a linear variable differential transformer having a movable element attached to rod 12. The rod is movable longitudinally of the housing 11, and a gage tip 13 is attached to the end thereof. The shape of the gage tip will depend upon the part being measured, and is here shown as a simple rounded tip adapted to contact a flat or cylindrical surface of a part 14 to be gaged. The gage head may be mounted in a stand, or a caliper, etc., as meets the requirements of a given application.

Referring to FIG. 2, the differential transformer physically contained within the gage head of FIG. 1 is shown as comprising a primary coil 21 and a pair of secondary coils 22, 22' connected in opposition. The movable core 23 is attached to rod 12 (FIG. 1). When the core 23 is in its central or null position, an A.-C. current in the primary 21 will induce equal voltages in the secondary coils 22, 22', and since the secondary coils are connected in opposition the resultant output voltage will be a minimum (ideally zero). When the core 23 is moved, an A.-C. output signal will be obtained which varies in amplitude with departures from the null, and is of opposite phase on opposite sides of the null. Differential transformers are well known in the art and need not be described further. The structural details may vary considerably and any suitable construction may be employed.

An oscillator 24 is provided for energizing the differential transformer. It may be of conventional design and its frequency selected to meet the requirements of the particular differential transformer selected. A frequency of the order of 5000 cycles has been employed with success. The oscillator should provide an output wave of stable frequency and amplitude so that accuracy of measurement will not be impaired.

The output of oscillator 24 is supplied through a transformer 25 having a center-tapped secondary winding 26 to the primary 21 of the differential transformer. A potentiometer 27 is inserted as a gain or magnification adjustment.

Potentiometer 29 is provided as an adjustable size control, or "zero adjust" control, to facilitate setting the apparatus to nominal part size. It is supplied from the output of the oscillator 24 and is adjustable to provide an A.-C. correction signal of adjustable amplitude and selectable opposite phase. As here shown, the potentiometer is connected across the secondary 26 through resistors 31, 31' shunted by respective capacitors 32, 32'. The midpoint of the potentiometer is effectively connected to the center tap of winding 26 by shunting the potentiometer with two equal resistors 28, 28', and connecting the center tap to the junction of the resistors. The center tap may be grounded as shown. Potentiometer 29 could be provided with a center tap connected directly to the center tap of secondary 26 and resistors 28, 28' omitted, if desired.

It will be seen that when the slider of potentiometer 29 is in its central position, it is at ground potential. However, when the slider is moved, an A.-C. voltage is obtained whose amplitude varies with the departure from the central position, and is of opposite phase on opposite sides of the central position. The slider is connected through line 33 to secondary coil 22' of the differential transformer. Thus, the A.-C. voltage from potentiometer 29 is added (algebraically) in series with the output voltage developed by the differential transformer. The capacitors 32, 32' shunting resistors 31, 31' shift the phase of the A.-C. voltage applied to the extremes of potentiometer 29, and the values are selected so that the output of potentiometer 29 is exactly in phase, or exactly out of phase, with the output of the differential transformer, depending on which side of the respective nulls the potentiometer slider and differential transformer core are.

The output of the differential transformer, with the zero adjust voltage added thereto, is supplied through the transformer 34 to an amplifier 35 and thence through coupling capacitor 36 and line 40 to the detector circuit 41. In the detector circuit a reference A.-C. voltage is obtained from oscillator 24 through the center-tapped secondary 42 of transformer 25. This reference voltage is applied to a bridge circuit containing two pairs of unilaterally conducting devices, here shown as crystal diodes 43, 43' and 44, 44'. Matched resistors 45 are inserted in series with the diodes to eliminate the effect of diode forward impedance mismatch with the secondary 42 of the transformer. The amplitude of the oscillator voltage across 42 is made sufficiently high so that diodes 43, 43' become strongly conducting in one-half of the cycle, and diodes 44, 44' become strongly conducting in the other half of the cycle.

Line 40, which supplies the signal to the detector, is connected to the center tap of secondary 42. This A.-C. signal wave is a sine wave and, when it is in phase with the voltage across secondary 42, a rectified voltage will be developed between the points A and B so that A is positive with respect to B. When the signal is opposite in phase, point B will be positive with respect to A. Storage capacitors 46, 46' are connected to points A and B respectively, and their other terminals returned through resistor 47 to the center tap of transformer secondary 42. These storage capacitors, by virtue of their filtering action, produce a substantially steady voltage in the output lines 48, 48' of the detector.

A positive voltage at A may be made to correspond to either oversize or undersize positions of core 23 of the differential transformer, depending on the phase of the oscillator voltage applied to primary 21 and secondary 42, and the number of phase reversals in the signal path, as will be understood. Here it is assumed that A is positive for oversize conditions.

The phase-sensitive detector circuit here employed is shown in copending application Serial No. 614,931, filed October 9, 1956, by Torn and Philbin, now U.S. Patent 2,932,134, and is described in more detail therein. In addition to being simple and reliable, it has the important advantage that it largely corrects for the fact that the output of a differential transformer, when the movable core is in its null position, is not exactly zero, and the output voltage is not exactly linear with displacement in the region near the null. If desired, however, other types of detectors can be employed.

The D.-C. output voltage across points A and B may be referenced to any desired potential by connecting a potential to a suitable point in the detector circuit. As here shown, point B is normally referenced to a positive potential by connecting line 48' to a voltage divider from the B+ power supply. This voltage divider comprises resistors 49, 49', and a capacitor 51 is shunted across the latter resistor for filtering purposes.

The output of the detector is supplied to the output lines 52, 52' which are connected to the classifier unit shown in FIG. 3. It is also supplied through a variable attenuator indicated generally as 53 to a meter 54. As here shown, the attenuator is of the step type and comprises three fixed attenuators 55, 56, 57 of the T-type, and a non-attenuating line 58 which can be alternatively connected between the detector and the actuating coil 59 of meter 54 by ganged switches 61, 61'. A resistor 62 is also placed in series with actuating coil 59.

When the ganged switch 61, 61' is in the position shown, the output of the detector 41 is supplied through line 58 to actuator coil 59 in series with resistor 62. The value of resistor 62 is selected so that the impedance of the load circuit is suitable for the detector 41. The attenuators 55, 56, 57 are designed so that substantially this same impedance is presented to the detector in the several positions of switch 61, 61'. In this manner, changing the position of the switch does not change the load on the detector, and hence the output of the detector at line 52, 52' is substantially unaffected.

The design of T-type attenuators having a constant input impedance is known in the art and need not be described here. Other types of attenuators presenting a substantially constant impedance to the detector can be employed if desired. With the type shown, the output impedance can be selected to critically damp the meter 54.

Meter 54 is here shown as of the zero-center type. Thus, when current flows through coil 59 in one direction, the pointer 64 moves to one side of zero, and when current flows in the opposite direction it moves to the other side of zero.

Before proceeding to describe the rest of the apparatus, the adjustment and operation of the portion shown in FIGS. 1 and 2 will be described. In initial set-up, if a part of the desired nominal size is available, it may be inserted under the gage head (FIG. 1) and the meter 54 brought to approximately zero by proper positioning of the gage head in the gage stand, caliper, etc. For this adjustment, the zero adjust potentiometer 29 may be in its central position. Then to bring the meter 54 exactly to zero, potentiometer 29 may be adjusted. For the final adjustment, attenuator 53 is advantageously switched to the most sensitive meter range, as shown.

Meter 54 will ordinarily be calibrated to read part size deviation in decimal parts of an inch, and the several positions of the attenuator 53 will introduce fixed multiplying factors. To insure that the indicated deviation on meter 54 is correct, after adjusting the zero as described, a shim of known thickness can be placed between the gage point 13 (FIG. 1) and the workpiece. If the meter deviation does not correspond to the known thickness, the magnification adjust potentiometer 27 may be adjusted until the proper reading is obtained.

If a part of precise nominal size is not available, a part of known size can be placed under the gage head. If necessary, the meter deviation accuracy can be checked by the shim method just explained. Then, by adjusting the position of the gage head and potentiometer 29, the meter may be made to read the difference between the known size of the part being measured and the desired nominal size. Thereafter, meter indications will be with reference to nominal size.

By using components of adequately close tolerances in the circuit, linear operation of the meter over its whole range may be obtained, so that further calibration is not necessary. Attenuators 53 are held to close tolerances in manufacture so that a precise multiplying factor can be introduced between detector 41 and meter 54.

Certain advantages of the size control and meter range switch arrangements described will now be apparent. By using an A.-C. size control circuit ahead of the detector, and an accurate attenuator which presents a constant impedance to the detector for all ranges, the zero adjustment simultaneously establishes a zero for all scale ranges. Also, since the A.-C. correction signal is derived from the oscillator 24 which also supplies the differential transformer, the zero adjustment is as stable as the measuring circuits; no additional sources of error being introduced. Further, the output of the detector at lines 52, 52' includes the information as to nominal part size, and the output is unaffected by the particular range selected by attenuator 53.

Referring now to FIG. 3, the output from the detector is supplied through lines 52, 52' to the input of a D.-C. amplifier indicated generally as 71. Input line 52' is shown grounded, and by reference back to FIG. 2 it will be seen that this grounds point B in the detector, thereby removing the bias supplied by the voltage divider 49, 49'. Resistor 49 is chosen large enough to avoid excessive drain on the power supply when point B is grounded. The reason for this is that, as actually constructed, the measuring unit shown in FIG. 2 is separately housed from the classifying unit shown in FIG. 3. The measuring unit can be used with other units if desired, and in such cases the positive reference voltage for the detector output is sometimes an advantage. When used with the classifier unit of FIG. 3, the positive reference voltage is unnecessary. If desired, both measuring and classifying circuits can be enclosed in one housing, and the bias source eliminated.

The signal in line 52 is supplied through a resistor 72 to the grid of a triode section 73. Triode sections 73 and 73' are connected as a balanced D.-C. amplifier and are here shown as two sections of a double triode tube, although separate tubes may be employed if desired. The cathodes are connected together and then through cathode resistor 74 to the negative side of the power supply, denoted B—, which in this embodiment is negative to ground. The grid of section 73' is connected to a voltage divider from B—, comprising resistor 75 and a variable resistor 76. Thus, the grid bias of section 73' may be adjusted to secure a desired operating point.

Anode potential for the two tube sections is obtained from a D.-C. power source denoted B+ through a common load resistor 77 and individual load resistors 78, 78'. A capacitor 79 is connected between the two anodes for high frequency compensation.

The anode outputs of triodes 73, 73' are connected to the grids of triodes 81', 81, respectively. Triodes 81, 81' have a common cathode resistor 82 connected to B—. The anodes thereof are conected through load resistors 83, 83' to B+. The anode output of triode 81 is fed through resistor 84 to the grid of a triode 85 which functions as a cathode follower. Capacitor 80 is connected from the grid of triode 85 to ground for phase shift correction.

The cathode load of triode 85 is provided by resistors 86, 86' connected in series between the cathode and B—. The signal output is fed through line 87 to the switching devices, as will be described. Negative feedback is obtained by supplying the voltage at the junction of resistors 86, 86' through line 88, one of resistors 89, and switch 91 to the grid of the input triode 73. Resistors 89 are of different value and, by changing the setting of switch 91, different amounts of negative feedback may be obtained, thereby changing the overall gain of the amplifier. Resistor 72 in the input circuit takes part in determining the amount of feedback, and also serves as an isolation resistor.

This type of D.-C. amplifier is well known in the art and need not be described further. While it has been found satisfactory in operation, other forms of amplifiers may be employed if desired.

The output signal from the amplifier is supplied through line 87 and "Manual-Automatic" switch 92 in its manual position, to the line 93 and thence to the input circuits of the switching devices 94, 94A–94E, respectively. The switching devices are here shown as gas discharge tubes of the four-element type. The switching tubes and associated circuitry are similar, and only the first stage will be described in detail.

Gas discharge tube 94 has a grounded cathode 95, a control grid 96, a screen grid 97 connected to the cathode, and an anode 98. The signal is fed through line 93 to the input circuit comprising resistors 99, 99' and potentiometer 101, returned to B—. The potential of the cathode of tube 85, and hence of input line 93, is here selected as substantially positive to ground in the absence of signal. Since the input circuit is returned to B—, the slider of potentiometer 101 can be set to provide bias voltages either positive or negative to ground as required.

Gas discharge tubes normally "fire" (change from non-conducting to conducting condition) when the control grid is slightly negative or slightly positive to the cathode, depending on the particular tube and the operating conditions. Hence, by changing the setting of potentiometer 101, the tube may be caused to fire when the applied signal reaches a selected value. For example, as the slider is moved downward, the control grid bias becomes more negative, thus requiring a larger signal excursion in the positive direction to fire the tube. The proportion of the signal output in line 93 which is effective at control grid 96 also varies with the setting of potentiometer 101, but this variation is small over the range of adjustment ordinarily employed, and in any event is in a direction which does not counteract the effect of change of bias.

The anode circuit of gas discharge tube 94 is A.-C. energized, and is supplied from a suitable source, for example a transformer connected to the power lines, through line 102. The actuating coil 103 of a relay, and resistors 107, 107' are connected in series between the anode 98 and line 102. Relay 103 is advantageously of the D.-C. type.

In operation, whenever the potential of grid 96 is below the critical value for the particular gas discharge tube and operating conditions employed, no anode current will flow. When, however, the grid potential exceeds the critical value, anode current will flow on positive half cycles of the applied A.-C. anode voltage. Consequently, current will flow through relay actuating coil 103 and move the corresponding relay switch arms 104, 105 and 106 to their upper positions. Capacitor 108 is connected across relay coil 103 so as to maintain current flow through the coil between half cycles, and consequently maintain actuation of the relay.

If, after firing, the potential of control grid 96 goes below the critical value, the tube will be extinguished on the next negative half cycle and anode current will cease. Current in coil 103 may persist for a short interval until capacitor 108 is sufficiently discharged, and the time constant may be selected to give a sufficiently fast release, while preventing chatter of the relay contacts during actuation.

In many cases it is desirable to maintain energization of the relays, once actuated. To this end, a rectifier 109 is connected in series with coil 103 on the side thereof toward tube 94, and to a normally-open contact on relay switch 104. When the relay is energized, switch arm 104 establishes a circuit from the A.-C. power source through relay coil 103, resistor 107, rectifier 109 and line 111 to arm 92' of the Manual-Automatic switch. In the manual position shown, the circuit is not completed. However, in the automatic position the circuit will be completed through plunger switch 115 to ground, thereby maintaining energization of relay coil 103 by current rectified in rectifier 109. Rectifier 109 may be of any suitable type, and is here shown as a crystal diode.

The other switching stages including tubes 94A–94E are similar and each contains an input potentiometer 101A–101E so that the firing or switching point of each stage can be separately adjusted. By appropriately setting the potentiometers, the tubes may be caused to switch progressively for progressive changes in the input signal.

Rectifier 109 and corresponding rectifiers in the other stages have a further important function, namely, to prevent interaction between stages through the hold circuits. For example, if tubes 94 and 94A were fired, thereby moving the arms of switches 104, 104A to their upper positions, a circuit would be established between the points in the anode circuits of the tubes to which the rectifiers are connected. Since the rectifiers are back-to-back with respect to this circuit, no current can flow therethrough and hence no interference will result. If the rectifiers were not present, subsequent extinction of one tube with the other tube still fired might maintain energization of both relay coils even though the hold circuit is opened by opening switch 115.

In normal use, switching takes place beginning with parts of the largest dimension and proceeding to parts of the smallest dimension, or vice versa, depending on whether a signal in line 93 in the negative direction corresponds to a larger or smaller dimension. It is here assumed that the signal in line 93 is most negative for the largest part size.

With the six switching stages provided in this embodiment, parts can be classified into seven grades. For such operation, the potentiometers 101–101E may be set sufficiently negative so that none of the tubes fire for a part of the largest dimension. Potentiometer 101 is then set so that tube 94 fires at a signal amplitude corresponding to a slightly smaller dimension, potentiometer 101A somewhat more negative so that tube 94A fires for a still smaller dimension, etc. The largest part may correspond to nominal part size, whereupon successive switching of the stages will correspond to successively increasing undersize conditions. Or, the potentiometer of any desired stage may be set to fire for nominal part size, whereupon preceding stages will fire for oversize conditions and succeeding stages for undersize conditions. All the tubes 94–94E will fire for the most undersize part.

Very rapid classification is possible, for example 90,000 pieces per hour, since all stages are in condition to be actuated at all times, except for the effect of the hold circuits which will be discussed hereinafter. If it is desired to make the tubes fire successively for increasing part size, the polarity of the signal supplied to line 93 may be reversed. This may be accomplished by suitable changes in amplifier 71, or by a suitable change of phase of the A.-C. signal in the measuring unit of FIG. 2. For example, interchanging the input connections to the primary 21 of the differential transformer will suffice.

In order to indicate to the operator the category in which a given part falls, a plurality of lamps 112–112F are provided, one to indicate the firing of each stage and an additional one to indicate that no stage has been fired. The lighting of the lamps is under the control of a set of switches 105–105E of the corresponding relays 103–103E. To this end each switch arm of switches 105–105E has respective normally-open and normally-closed contacts cooperating therewith, and the switch arms are connected to like contacts of the other switches in succession. Thus, in the specific embodiment shown, the switch arm of 105A is connected to the normally-open contact of switch 105, the switch arm of 105B is connected to the normally-open contact of 105A, etc. This forms a series circuit under the control of the relays, and the source of power is connected at one end of this circuit through line 113. The lamps 112–112E are connected to the other like contacts of switches 105–105E, in this case to the normally-closed contacts. At the opposite end of the circuit, lamp 112F is connected to the normally-open contact of switch 105E. The other terminals of the lamps are connected to the return line 113′ of the power source.

If the applied signal is such that none of the tubes 94–94E is fired, all relays will be in their unenergized condition as shown, and only lamp 112 will be lighted. If the signal then changes to fire tube 94, the switch arm of 105 will move to its upper position, breaking the circuit to lamp 112 and lighting lamp 112A. If the signal further changes so as to fire, say, tube 94B, the preceding tubes 94 and 94A will likewise be fired, and the switch arms of 105, 105A and 105B will all be in their upper positions. This breaks the circuits to lamps 112, 112A and 112B, and establishes an energizing circuit for lamp 112C. Finally, if all tubes are fired, lamp 112F will be lighted, and the circuits to all other lamps will be broken. It will therefore be seen that only one lamp is lighted for a given part being measured, thus giving a positive indication to the operator without confusion due to other lamps being lighted.

Output circuits are also provided for control purposes. To this end, relays 103–103E have a third set of switches 106–106E, with normally-open and normally-closed contacts associated with the respective switch arms. In this case also, connections are provided from the switch arms to like contacts of other switches in succession. Thus, the switch arm of 106 is connected to the normally-closed contact of 106A, the switch arm of 106A is connected to the normally-closed contact of 106B, etc. The switch arm of the last switch 106E is connected to line 114 which serves as a common connection for external control apparatus.

The normally-closed contact of switch 106 is connected to a line denoted G1 which is effective when none of the tubes 94–94E is fired. The other like contacts of the switches, here shown as the normally-open contacts, are connected to respective lines G2–G7. Thus, if tube 94 is fired, the switch arm of 106 goes to its upper position, thereby breaking the circuit to G1 and establishing a circuit from the common lead 114 to the lead G2. If tubes 94, 94A and 94B are fired, movement of the switch arm of 106B to its upper position breaks the circuit from the common lead 114 to the preceding switches 106, 106A, and establishes a circuit from the common lead 114 to the output lead G4. Thus, for any given part being measured, only one of the output leads G1–G7 will be effective.

The output circuits may be used as required for the particular application. For example, they can be used to control sorting means for physically segregating the parts into corresponding grades, or to make adjustments in the machine tool producing the parts, etc.

The specific circuits shown for energizing the lamps and for establishing output circuits shown two alternative arrangements for insuring that only one operating circuit of each set will be effective for a given part being measured. If desired, the circuit arrangement shown for establishing output circuits G1–G7 could be employed to light the lamps, and vice versa, or the same circuit arrangement could be used for each purpose. For example, leads G1–G7 could be connected to respective lamps and power applied to the common lead 114. The other terminals of the lamp would be connected to the return side of the power source. In such case, when none of the tubes 94–94E is fired, the lamp connected to G1 would be lighted. If tubes 94 and 94A were fired, the lamp connected to G3 would be lighted but no others, etc.

Similarly, the leads from the normally-closed contacts of switches 105–105E could be used as output leads G1–G6, instead of being connected to lamps, and line 113 could be used as the common lead in place of 114. In this event, the lead from the normally-open contact of switch 105E would be used as lead G7.

It will be appreciated that the choice of one of the two circuit arrangements largely depends on which end of the string of switches is to serve as the common connection, or is to be connected to the power supply.

In using the classifying unit it is necessary to set the potentiometers 101–101E in the input circuits of the respective gas discharge tubes so that the tubes will fire for different selected sizes of the parts being gaged. This could be accomplished by placing parts of the selected sizes under the gage head of FIG. 1, and adjusting potentiometers 101–101E until respective tubes fire for respective parts. This procedure is time-consuming and requires parts having the precise dimensions for the several categories.

In accordance with the present invention, a simple, convenient and accurate means for calibrating is provided. To this end, a calibrating signal is supplied to a point in the circuit where the part size signal is common to the classifying unit and to the indicating meter in normal operation. The calibrating signal is of the same type as the part size signal which would exist at that point in operation. As specifically shown, an adjustable D.-C. calibrating signal is supplied to the output circuit of the detector 41, thereby being simultaneously supplied to the input of the classifying unit and to the meter in the measuring unit. Thus, tubes 94–94E can be set to fire at desired points on the indicating meter. Since the indicating meter is itself calibrated to read variations in part size, the tubes in the classifier unit will fire at corresponding points.

The adjustable D.-C. calibration signal is conveniently obtained by a potentiometer 121 connected in series from B— to B+ of the power supply. Resistors 122, 122' are inserted to limit the range of voltages obtainable by moving the slider 121', and also to increase the sensitivity of the adjustment by allowing a larger movement of the slider for a given change in voltage. The voltage at slider 121' may be made positive or negative to ground, and is supplied through a calibration switch 123, switch 124 and line 125 to the input line 52. Switch 124 allows one of the resistors 126, 126' to be inserted in the series circuit, or a direct connection through line 127, to provide different adjustment sensitivities.

It will be noted that input line 52 is connected to the output of detector 41 (FIG. 2), and hence the calibration signal is supplied to meter 54 through the variable attenuator 53.

In calibrating, switch 91 is set to give the desired amplification, depending upon the variation expected in part size. If the variations are small, maximum amplification is usually desirable. For larger variations the gain may be reduced to avoid overloading. Switch 124 may be ganged with switch 91, as shown, so that the appropriate series resistor is inserted in the calibration circuit, or may be separately operable. As the amplifier gain is increased, the series resistance in the calibration circuit is advantageously increased, since the signal range will be smaller and a finer adjustment of the calibrating signal is desirable.

The potentiometer 121 is then adjusted until the indication on meter 54 is the highest value in the desired range, say +0.001 inch, and potentiometers 101–101E adjusted so that no tube is fired and lamp 112 is lighted. Potentiometer 121 is then changed so that meter 54 reads the next grade, say, +0.0005 inch, and the input potentiometers adjusted so that tube 94 fires but not the others, lighting lamp 112A. Potentiometer 121 may then be adjusted until the meter reads, say, zero, and potentiometer 101A adjusted until tube 94A just fires. Similarly, additional adjustments may be performed to cause the remaining tubes to fire progressively for progressively increasing signals corresponding to undersize conditions. If the tolerance for any desired grade is within a more sensitive range on meter 54, attenuator 53 may be switched accordingly. This allows calibrating small tolerances more accurately, as is often advantageous.

This calibration procedure insures that the classifying circuits will grade the parts in exact accordance with the indications on meter 54 and no new sources of error are introduced. The accuracy of the meter indications is insured by proper adjustment of the measuring unit as described hereinbefore.

The classifier unit has both manual and automatic positions of switch 92, 92'. In the manual position shown, the hold circuits are disabled since switch 92' is open, and the lamps 112–112F continuously follow the movement of the gage tip, and hence the dimensions of the parts being gaged. This is helpful for initial set up and adjustment, and is also useful when an operator is gaging and sorting parts by hand.

For automatic operation, switches 92, 92' are moved to the automatic position. This completes the hold circuits through line 111 and plunger switch 115 to ground. Also, the signal output of the amplifier 71 is applied to the tubes 94–94E only when the plunger switch 131 is closed. When a part is in position to be gaged, plunger switch 131 is closed and the appropriate tube or tubes 94–94E fire depending on part size. The corresponding relay or relays 103–103E are actuated and establish respective hold circuits through relay switches 104–104E. Also, one of lamps 112–112F is lighted and one of output circuits G1–G7 established. Upon opening switch 131 the fired tubes are extinguished, but the hold circuits maintain actuation of the corresponding relays until plunger switch 115 is opened.

For example, suppose that when switch 131 is closed the dimension of the part is such that tubes 94 and 94A are fired. Relays 103 and 103A will be energized, thereby establishing hold circuits for both tubes through relay arms 104, 104A. As before described, only lamp 112B will be lighted and only output lead G3 will be effective. Switch 131 may then be opened, but the hold circuits will remain effective until switch 115 is opened, whereupon the apparatus will return to its initial condition ready for another measurement.

In some cases plunger switches 131 and 115 can be manually operated, either separately or by a single control. A simple single control could be a switch having a pair of normally open contacts serving as switch 131, and a pair of normally closed contacts serving as switch 115. Upon actuating the switch, the signal will be applied to the switching tubes and the hold circuit broken. Upon releasing the switch, the signal will be removed and the hold circuit established. While it would be preferable to establish the hold circuit before breaking the signal circuit, if the switch action is fast enough the hold circuit will be established before the relays have time to release. More elaborate devices may be provided if desired.

While such manual operation is useful, the classifier is capable of extremely high speed operation, for example 90,000 pieces per hour. For such use, parts will be fed automatically to the gage station and plunger switches 131 and 115 operated automatically in synchronism with the feeding of parts. In such operation the hold circuits are particularly important, since they hold over the light indication and maintain the corresponding output control circuit G1–G7 during the interval between the removal of one part from gaging position and the substitution of the next part. Such rapid operation is made possible by the fact that it is not necessary for the switch tubes to revert to their base grade, that is, all tubes fired or all tubes unfired, before a new measurement is made.

Another use is the determination of the minimum or maximum size of a part. If switch 92, 92' is placed in the automatic position and both switches 131 and 115 are closed, the minimum dimension of a part as it is moved under the gage head will be indicated. Or, by reversing the polarity at the gage head, etc., the maximum part dimension can be indicated.

The invention has been described in connection with a specific embodiment thereof and a number of features have been pointed out and others will be clear from the foregoing description. If desired, one or more features may be employed while omitting others.

Detailed circuits have been given for completeness of disclosure and to enable the ready practice of the invention, but it will be understood that many modifications may be made therein within the spirit and scope of the invention, and component circuits replaced by other suitable circuits as meets the requirements of a given application. For example, while linear variable differential transformers have been found satisfactory in the gage head, other types of transducers can be employed if desired. Among suitable types are variable capacity or inductance transducers, advantageously employed in bridge circuits. These may be energized with A.-C. from a suitable source, and the same source employed to obtain the correction signal for size control. Switching devices of the gas discharge type have been described and have been found satisfactory in use. However, other types of switching devices are known to the art, including vacuum tubes, diodes, semi-conducting devices, etc. in suitable arrangements, and may be employed if desired. The number of classifying stages may be selected as required for the intended use.

We claim:

1. Gaging apparatus which comprises gaging means including a transducer responsive to variations in the size of parts being gaged, an A.-C. power source connected to said gaging means, said gaging means being adapted to yield an A.-C. output signal of corresponding frequency which varies in amplitude with part size, a size control circuit connected with said A.-C. power source and adjustable to obtain therefrom an A.-C. correction signal of adjustable amplitude, circuit means for combining said correction and output signals, a detector supplied with said combined signals and yielding a correspondingly varying D.-C. output signal, an indicating meter supplied from the output of said detector through a variable attenuator, said variable attenuator presenting a substantially constant impedance to said detector, and an output circuit from said detector connected between said detector and said attenuator.

2. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element and of opposite phase on opposite sides of the null, a size control circuit connected to said oscillator and adjustable to obtain therefrom an A.-C. correction signal of adjustable amplitude and of selectable opposite phase, circuit means for combining said correction and output signals, a detector supplied with said combined signals and yielding a correspondingly varying D.C. output signal, an indicating meter supplied from the output of said detector through a variable attenuator, said variable attenuator presenting a substantially constant impedance to said detector, and an ouput circuit from said detector connected between said detector and said attenuator.

3. Gaging apparatus which comprises a gaging device including a variable differential transformer having a movable element adapted to vary with the size of parts being gaged, an oscillator for energizing said differential transformer, said differential transformer yielding an A.C. output signal varying in amplitude with departures from the null position of the movable element, a size control circuit for obtaining an A.C. correction signal of adjustable amplitude from said oscillator, circuit means for adding said correction and output signals, a detector supplied with said added signals and yielding a correspondingly varying D.C. output signal, an indicating meter supplied from the output of said detector through a variable attenuator, said variable attenuator presenting a substantially constant impedance to said detector, means for adjusting said size control circuit to vary the A.C. correction signal therefrom and thereby obtain a predetermined meter indication corresponding to nominal part size, and an output circuit from said detector connected between said detector and said attenuator.

4. Gaging apparatus which comprises a gaging device including a variable differential transformer having a movable element adapted to vary with the size of parts being gaged, an oscillator for energizing said differential transformer, said differential transformer yielding an A.C. output signal varying in amplitude with departures from the null position of the movable element and of opposite phase on opposite sides of the null, a size control circuit connected to the output of said oscillator and adjustable to obtain an A.C. correction signal therefrom of adjustable amplitude and of selectable opposite phase, circuit means for adding said correction and output signals, a balanced detector supplied with said added signals and with an A.C. reference voltage from said oscillator, said detector yielding a D.C. output signal varying with the amplitude of said added signals and of opposite sign for opposite phases of said added signals with respect to said A.C. reference voltage, a variable attenuator having a substantially constant input impedance connected to the output of said detector, a zero-center indicating meter connected to the output of said attenuator, said size control circuit enabling said meter to be set to zero for a part of nominal size, and an output circuit from said detector connected between said detector and said attenuator.

5. Gaging apparatus which comprises a gaging device adapted to yield an A.C. output signal varying with the size of parts being gaged, a detector supplied with said A.C. signal and yielding a correspondingly varying D.C. output signal, an indicating meter for indicating variations in part size, a classifying circuit including a plurality of switching devices, connections from the output of said detector for supplying signals to said indicating meter and to the input of said classifying circuit which are directly proportional to said D.C. output signal, said switching devices being individually settable to switch at selected values of the input signal to the classifying circuit, and an adjustable D.C. calibration source selectably connected to the output of said detector to thereby supply a calibrating signal to said input of the classifying circuit and a corresponding directly proportional signal to said indicating meter, whereby said switching devices may be set to switch at selected indicating positions of said meter corresponding to selected variations in part size.

6. Gaging apparatus which comprises a gaging device adapted to yield an A.C. output signal varying with the size of parts being gaged, a detector supplied with said A.C. signal and yielding a correspondingly varying D.C. output signal, an indicating meter for indicating variations in part size, a classifying circuit including a plurality of switching devices, connections from the output of said detector for supplying signals to said indicating meter and to the input of said classifying circuit which are directly proportional to said D.C. output signal, said switching devices being individually settable to switch at selected values of the input signal to the classifying circuit, and an adjustable D.C. calibration source selectably connected to the said classifying circuit input and to said meter to thereby supply a calibrating signal to said classifying circuit and a corresponding directly proportional signal to said indicating meter, whereby said switching devices may be set to switch at selected indicating positions of said meter corresponding to selected variations in part size.

7. Gaging apparatus which comprises a gaging device adapted to yield an A.C. output signal varying with the size of parts being gaged, an adjustable size control circuit yielding an A.C. correction signal of adjustable amplitude, a detector supplied with said A.C. output and correction signals and yielding a corresponding D.C. output signal, an indicating meter, a classifying circuit including a plurality of switching devices, connections from the output of said detector for supplying signals to said indicating meter and to the input of said classifying circuit which are directly proportional to said D.C. output signal, said meter thereby indicating variations in part size and said size control circuit enabling the meter to be set to a selected indication for a part of nominal size, said switching devices being individually settable to switch at selected values of the input signal to the classifying circuit, and an adjustable D.C. calibration source selectably connected to the output of said detector to thereby supply a calibrating signal to said input of the classifying circuit and a corresponding directly proportional signal to said indicating meter, whereby said switching devices may be set to switch at selected indicating positions of said meter corresponding to selected variations in part size.

8. Gaging apparatus which comprises a gaging device including a variable differential transformer having a movable element adapted to vary with the size of parts being gaged, an oscillator for energizing said differential transformer, said differential transformer yielding an A.C. output signal varying in amplitude with departures from the null position of the movable element, a size control circuit for obtaining an A.C. correction signal of adjustable amplitude from the output of said oscillator, circuit means for adding said correction and output signals, a detector supplied with said added signals and yielding a correspondingly varying D.C. output signal, an indicating meter, connections from the output of said detector to said meter, means for adjusting said size control circuit to vary the A.C. correction signal therefrom and thereby obtain a predetermined meter indication corresponding to nominal part size, a classifying circuit including a plurality of switching devices, connections from the output of said detector to the input of the classifying circuit for supplying signals thereto directly proportional to the signals applied to said meter, said switching devices being individually settable to switch at selected values of the input signal to the classifying circuit, and an adjustable D.C. calibration source selectably connected to the output of said detector to thereby supply a calibrating signal to said input of the classifying circuit and a corresponding directly proportional signal to said indicating meter, whereby said switching devices may be set to switch at selected indicating positions of said meter corresponding to selected variations in part size.

9. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element, a size control circuit for obtaining an A.-C. correction signal of adjustable amplitude from said oscillator, circuit means for adding said correction and output signals, a detector supplied with said added signals and yielding a correspondingly varying D.-C. output signal, a variable attenuator having a substantially constant input impedance connected to the output of said detector, an indicating meter connected to the output of said attenuator, means for adjusting said size control circuit to vary the A.-C. correction signal therefrom and thereby obtain a predetermined meter indication corresponding to nominal part size, a classifying circuit having an input circuit connected to the output of said detector at the input to said attenuator, said classifying circuit including a plurality of switching devices individually settable to switch at selected values of the D.-C. signal, supplied to the input thereof, and an adjustable D.-C. calibration source selectably connected to the input circuit of the classifying circuit for supplying a calibrating signal to the classifying circuit and a corresponding directly proportional signal to the indicating meter, whereby said switching devices may be set to switch at selected indicating positions of said meter corresponding to selected variations in part size.

10. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element and of opposite phase on opposite sides of the null, a size control circuit connected to the output of said oscillator and adjustable to obtain therefrom an A.-C. correction signal of adjustable amplitude and of selectable opposite phase, circuit means for adding said correction and output signals, a balanced detector supplied with said added signals and with an A.-C. reference voltage from said oscillator, said detector yielding a D.-C. output signal varying with the amplitude of said added signals and of opposite sign for opposite phases of said added signals with respect to said A.-C. reference voltage, a variable attenuator having a substantially constant input impedance connected to the output of said detector, a zero-center indicating meter connected to the output of said attenuator, said size control circuit enabling said meter to be set to zero for a part of nominal size, a classifying circuit including an amplifier having an input circuit connected to the output of said detector at the input to said attenuator, said classifying circuit including a plurality of switching devices connected to receive the output of said amplifier and individually settable to switch at selected values of the D.-C. signal supplied to the amplifier input, a D.-C. calibration source adjustable in magnitude and sign, and selectable connections from said calibration source to the input circuit of said amplifier for supplying a calibrating signal to the classifying circuit and a corresponding directly proportional signal to the indicating meter, whereby said switching devices may be set to switch at selected indicating positions of said meter corresponding to selected variations in part size.

11. Gaging apparatus which comprises a plurality of electronic switching devices having respective input and output circuits, means for supplying an electrical signal varying with the size of parts being gaged to the input circuits of said switching devices, adjustable means in said input circuits for setting said devices to switch progressively for progressive changes in said signal, a plurality of relays having actuating elements connected in respective output circuits of said switching devices in series with a power source, the series circuits including said output circuits and respective relay actuating elements being connected in parallel with respect to said power source, a hold circuit for each of said relays including a rectifier and a switch actuated by the corresponding relay in series with the respective actuating element and the power source for maintaining energization of the actuating element after initial energization thereof by the respective switching device, and switch means in said hold circuits actuable to simultaneously disable the hold circuits of said plurality of relays.

12. Gaging apparatus which comprises a plurality of electronic switching devices having respective input and output circuits, means for supplying an electrical signal of amplitude varying with the size of parts being gaged to the input circuits of said switching devices, adjustable means in said input circuits for setting said devices to switch progressively for progressive changes in the amplitude of said signal, a plurality of relays having actuating elements connected in respective output circuits of said switching devices in series with an A.-C. power source, the series circuits including said output circuits and respective relay actuating elements being connected in parallel with respect to said power source, a hold circuit for each of said relays including a rectifier and a switch actuated by the corresponding relay in series with the respective actuating element and the A.-C. power source for maintaining energization of the actuating element after initial energization thereof by the respective switching device, and switch means in said hold circuits actuable to simultaneously disable the hold circuits of said plurality of relays.

13. Gaging apparatus which comprises a plurality of electronic switching devices having respective input and output circuits, means for supplying an electrical signal of amplitude varying with the size of parts being gaged to the input circuits of said switching devices, adjustable means in said input circuits for setting said devices to switch progressively for progressive changes in the amplitude of said signal, a plurality of relays having respective actuating coils connected in respective output circuits of said switching devices in series with an A.-C. power source, the series circuits including said output circuits and respective relay actuating coils being connected in parallel with respect to said power source, a hold circuit for each of said relays including a rectifier and a switch actuated by the corresponding relay coil, each rectifier and switch being connected in series with the corresponding relay coil and said A.-C. power source on the side of the coil toward the corresponding switching device for maintaining energization of the coil after initial energization thereof by the switching device, and switch means in said hold circuits actuable to simultaneously disable the hold circuits of said plurality of relays.

14. Gaging apparatus which comprises a plurality of grid-controlled gas-discharge tubes each having a control grid input circuit and an anode output circuit, means for supplying an electrical signal of amplitude varying with the size of parts being gaged to the input circuits of said gas-discharge tubes, adjustable means in said input circuits for setting said tubes to switch from non-conducting to conducting conditions progressively for progressive changes in the amplitude of said signal, a plurality of relays having respective actuating coils connected in respective output circuits of said gas-discharge tubes in series with an A.-C. anode power source, the series circuits including said output circuits and respective relay actuating coils being connected in parallel with respect to said power source, a hold circuit for each of said relays including a rectifier and a switch actuated by the corresponding relay coil, each rectifier and switch being connected in series with the corresponding relay coil and said A.-C. power source on the side of the coil toward the corresponding tube for maintaining energization of the coil after initial energization thereof by the tube, and switch means in said hold circuits actuable to simultaneously disable the hold circuits of said plurality of relays.

15. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element, a size control circuit for obtaining an A.-C. correction signal of adjustable amplitude from said oscillator, circuit means for adding said correction and output signals, a detector supplied with said added signals and yielding a correspondingly varying D.-C. output signal, an indicating meter, connections from the output of said detector to said meter, means for adjusting said size control circuit to vary the A.-C. correction signal therefrom and thereby obtain a predetermined meter indication corresponding to nominal part size, a classifying circuit including a plurality of switching devices, connections from the output of said detector to the input of the classifying circuit for supplying signals thereto directly proportional to the signals supplied to said meter, said switching devices being individually settable to switch at selected values of the D.-C. signal supplied to the input of the classifying circuit, an adjustable D.-C. calibration source selectably connected to the output of said detector to supply a calibrating signal to the input of said classifying circuit and a corresponding directly proportional signal to the indicating meter to thereby enable said switching devices to be set to switch at selected indicating positions of said meter corresponding to selected variations in part size, a plurality of relays having actuating elements connected in respective output circuits of said switching devices in series with an A.-C. power source, the series circuits including said output circuits and respective relay actuating elements being connected in parallel with respect to said power source, a hold circuit for each of said relays including a rectifier and a switch actuated by the corresponding relay in series with the respective actuating element and the A.-C. power source for maintaining energization of the actuating element after initial energization thereof by the respective switching device, and switch means in said hold circuits actuable to simultaneously disable the hold circuits of said plurality of relays.

16. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element, a size control circuit for obtaining an A.-C. correction signal of adjustable amplitude from the output of said oscillator, circuit means for adding said correction and output signals, a detector supplied with said added signals and yielding a correspondingly varying D.-C. output signal, a variable attenuator having a substantially constant input impedance connected to the output of said detector, an indicating meter connected to the output of said attenuator, means for adjusting said size control circuit to vary the A.-C. correction signal therefrom and thereby obtain a predetermined meter indication corresponding to nominal part size, a classifying circuit including a plurality of grid-controlled gas-discharge tubes, connections from the junction of the detector output and attenuator input circuits to said classifying circuit to supply said D.-C. signal to the input circuits of said gas-discharge tubes, adjustable means in said input circuits for setting said tubes to switch from non-conducting to conducting conditions progressively for progressive changes in said D.-C. signal, an adjustable D.-C. calibration source selectably connected to the connections between the detector output and classifying circuit for supplying a calibrating signal to the classifying circuit and a corresponding directly proportional signal to the indicating meter to thereby enable said tubes to be set to switch at selected indicating positions of said meter corresponding to selected variations in part size, a plurality of relays having respective actuating coils connected in respective output circuits of said gas-discharge tubes in series with an A.-C. anode power source, the series circuits including said output circuits and respective relay actuating coils being connected in parallel with respect to said power source, a hold circuit for each of said relays including a rectifier and a switch actuated by the corresponding relay coil, each rectifier and switch being connected in series with the corresponding relay coil and said A.-C. power source on the side of the coil toward the corresponding tube for maintaining energization of the coil after initial energization thereof by the tube, and switch means in said hold circuits actuable to simultaneously disable the hold circuits of said plurality of relays.

17. Gaging apparatus which comprises a plurality of electronic switching devices having respective input and output circuits, means for supplying an electrical signal varying with the size of parts being gaged to the input circuits of said switching devices, adjustable means in said input circuits for setting said devices to switch progressively for progressive changes in said signal, a plurality of relays having actuating elements connected in respective output circuits of said switching devices in series with a power source, the series circuits including said output circuits and respective relay actuating elements being connected in parallel with respect to said power source, first and second sets of switches actuated by said relays respectively, said second set having respective switch arms and normally-open and normally-closed contacts cooperating therewith, a hold circuit for each of said relays including a rectifier and the respective switch of said first set in series with the respective actuating elements and the power source for maintaining energization of the actuating element after initial energization thereof by the respective switching device, switch means in said hold circuits actuable to disable simultaneously the hold circuits of said relays, connections from the switch arms in said second set to like contacts of other switches in said second set in succession to form a control circuit under the control of said relays, and connections from the other like contacts of the switches in said second set and a connection from one end of said control circuit for operating additional devices in accordance with the operation of said switching devices.

18. Gaging apparatus which comprises a plurality of grid-controlled gas-discharge tubes, means for supplying an electrical signal of amplitude varying with the size of parts being gaged to the input circuits of said gas-discharge tubes, adjustable means in said input circuits for setting said tubes to switch from non-conducting to conducting conditions progressively for progressive changes in said signal amplitude, a plurality of relays having respective actuating coils connected in respective output circuits of said tubes in series with an A.-C. power source, the series circuits including said output circuits and respective relay actuating coils being connected in parallel with respect to said power source, first and second sets of switches actuated by said relays respectively, said second set having respective switch arms and normally-open and normally-closed contacts cooperating therewith, a hold circuit for each of said relays including a rectifier and the respective switch of said first set connected in series with the corresponding relay coil and said A.-C. power source on the side of the coil toward the corresponding tube, switch means in said hold circuits actuable to disable simultaneously the hold circuits of said relays, connections from the switch arms in said second set to like contacts of other switches in said second set in succession to form a control circuit under the control of said relays, a plurality of indicating devices connected to the other like contacts of said second set of switches respectively, and a connection from one end of said control circuit for energizing said indicating devices, whereby progressive switching of said switching devices establishes circuits for energizing successive indicating devices and breaks the circuits for energizing preceding indicating devices.

19. Gaging apparatus which comprises a gaging device including a variable differential transformer having a movable element adapted to vary with the size of parts being gaged, an oscillator for energizing said differential transformer, said differential transformer yielding an A.-C. output signal varying in amplitude with departures from the null position of the movable element, a size control circuit for obtaining an A.-C. correction signal of adjustable amplitude from the output of said oscillator, circuit means for adding said correction and output signals, a detector supplied with said added signals and yielding a correspondingly varying D.-C. output signal, a variable attenuator having a substantially constant input impedance connected to the output of said detector, an indicating meter connected to the output of said attenuator, means for adjusting said size control circuit to vary the A.-C. correction signal therefrom and thereby obtain a predetermined meter indication corresponding to nominal part size, a classifying circuit including an input amplifier and a plurality of grid-controlled gas-discharge tubes connected to receive the amplifier output, connections from the output of said detector to the input of said amplifier to supply a corresponding D.-C. signal to the input circuits of said gas-discharge tubes, adjustable means in said input circuits for setting said tubes to switch from non-conducting to conducting conditions progressively for progressive changes in said D.-C. signal, an adjustable D.-C. calibration source selectably connected to the connections between the detector output and amplifier input for supplying a calibrating signal to the classifying circuit and a corresponding directly proportional signal to the indicating meter to thereby enable said tubes to be set to switch at selected indicating positions of said meter corresponding to selected variations in part size, a plurality of relays having respective actuating coils connected in respective output circuits of said tubes in series with an A.-C. power source, the series circuits including said output circuits and respective relay actuating coils being connected in parallel with respect to said power source, first and second sets of switches actuated by said relays respectively, said second set having respective switch arms and normally-open and normally-closed contacts cooperating therewith, a hold circuit for each of said relays including a rectifier and the respective switch of said first set connected in series with the corresponding relay coil and said A.-C. power source on the side of the coil toward the corresponding tube, switch means in said hold circuits actuable to disable simultaneously the hold circuits of said relays, connections from the switch arms in said second set to like contacts of other switches in said second set in succession to form a control circuit under the control of said relays, a plurality of indicating devices connected to the other like contacts of said second set of switches respectively, and a connection from one end of said control circuit for energizing said indicating devices, whereby progressive switching of said switching devices establishes circuits for energizing successive indicating devices and breaks the circuits for energizing preceding indicating devices.

References Cited in the file of this patent

UNITED STATES PATENTS

| | | |
|---|---|---|
| 1,901,343 | Eastham | Mar. 14, 1933 |
| 2,016,978 | Thomas | Oct. 8, 1935 |
| 2,146,581 | Kaufman | Feb. 7, 1939 |
| 2,312,357 | Odquist et al. | Mar. 2, 1943 |
| 2,370,073 | Reason | Feb. 20, 1945 |
| 2,400,571 | Olesen | May 21, 1946 |
| 2,429,891 | Neff | Oct. 28, 1947 |
| 2,566,767 | Hunt | Sept. 4, 1951 |
| 2,585,589 | Rockafellow | Feb. 12, 1952 |
| 2,654,057 | Rivenburg | Sept. 29, 1953 |
| 2,824,299 | Haines et al. | Feb. 18, 1958 |
| 2,885,660 | Hecox et al. | May 5, 1959 |
| 2,892,132 | Mallory | June 23, 1959 |